US009802590B2

(12) United States Patent
Drumm

(10) Patent No.: US 9,802,590 B2
(45) Date of Patent: Oct. 31, 2017

(54) BRAKE SYSTEM FOR MOTOR VEHICLES

(75) Inventor: Stefan A. Drumm, Saulheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 54 days.

(21) Appl. No.: 13/988,211

(22) PCT Filed: Nov. 17, 2011

(86) PCT No.: PCT/EP2011/070338
§ 371 (c)(1),
(2), (4) Date: May 17, 2013

(87) PCT Pub. No.: WO2012/069353
PCT Pub. Date: May 31, 2012

(65) Prior Publication Data
US 2013/0234502 A1    Sep. 12, 2013

(30) Foreign Application Priority Data

Nov. 26, 2010  (DE) .................. 10 2010 062 010
Nov. 14, 2011  (DE) .................. 10 2011 086 258

(51) Int. Cl.
*B60T 13/74*    (2006.01)
*B60T 13/14*    (2006.01)
(Continued)

(52) U.S. Cl.
CPC .............. *B60T 13/14* (2013.01); *B60T 7/042* (2013.01); *B60T 8/4077* (2013.01); *B60T 11/20* (2013.01); *B60T 13/686* (2013.01)

(58) Field of Classification Search
CPC . B60T 8/17; B60T 8/4081; B60T 8/42; B60T 13/00; B60T 13/148; B60T 13/588; B60T 13/60; B60T 13/68; B60T 2210/404; B60T 8/4077; B60T 13/14; B60T 13/686; B60T 7/042; B60T 11/20
(Continued)

(56) References Cited

U.S. PATENT DOCUMENTS 3,979,153 A * 9/1976 Ingram et al. ............... 303/6.01
4,405,183 A * 9/1983 Resch ........................ 303/119.1
(Continued)

FOREIGN PATENT DOCUMENTS

DE          3131095 A  *  2/1983
DE   10 2006 036 311 A1    2/2008
(Continued)

OTHER PUBLICATIONS

Machine translation of DE-102009024034.*
(Continued)

*Primary Examiner* — Melody Burch
(74) *Attorney, Agent, or Firm* — Brinks Gilson & Lione

(57) ABSTRACT

The invention relates to a brake system for motor vehicle. A piston-cylinder arrangement can be actuated by means of a brake pedal, a controllable pressure source and brake pressure modulation valves. In order to provide a piston-cylinder arrangement which is easy to implement and axially short, the invention proposes that the piston of the piston-cylinder arrangement is directly guided in a housing that accommodates further components of the brake system according to the invention.

15 Claims, 1 Drawing Sheet

(51) Int. Cl.
*B60T 7/04* (2006.01)
*B60T 8/40* (2006.01)
*B60T 11/20* (2006.01)
*B60T 13/68* (2006.01)
*B60T 8/36* (2006.01)

(58) Field of Classification Search
USPC .... 303/3, 15, 20, 113.4, 114.2, 115.1, 116.2, 303/119.1, 122, 122.12, DIG. 1, DIG. 2; 188/151 R, 345; 60/581
See application file for complete search history.

(56) References Cited

U.S. PATENT DOCUMENTS

| | | | | |
|---|---|---|---|---|
| 4,464,899 | A | * | 8/1984 | Myers et al. ............... 60/547.1 |
| 4,604,870 | A | * | 8/1986 | Bach et al. ...................... 60/551 |
| 6,164,734 | A | * | 12/2000 | Otomo et al. ............. 303/122.1 |
| 8,544,962 | B2 | * | 10/2013 | Ganzel ............................ 303/10 |
| 2002/0011750 | A1 | | 1/2002 | Higashimura et al. |
| 2007/0164607 | A1 | * | 7/2007 | Itoh ............................... 303/155 |
| 2008/0179941 | A1 | * | 7/2008 | Matsushita .................... 303/20 |
| 2010/0001577 | A1 | * | 1/2010 | Hatano ................. B60T 8/4081 303/3 |
| 2011/0291469 | A1 | * | 12/2011 | Drumm ................. B60T 8/4077 303/2 |
| 2016/0076561 | A1 | * | 3/2016 | Green ..................... B64C 25/60 92/143 |

FOREIGN PATENT DOCUMENTS

| | | |
|---|---|---|
| DE | 10 2006 040 424 A1 | 3/2008 |
| DE | 10 2009 024 034 A1 | 8/2010 |
| DE | 10 2009 024 035 A1 | 8/2010 |
| EP | WO 01/72567 A1 | 10/2001 |
| GB | 2 050 540 A | 4/1980 |
| WO | WO-2009058916 A2 * | 5/2009 |

OTHER PUBLICATIONS

Espacenet front page for DE-102009024034 reference.*
English Machine Translation of DE-102006036311.*
PCT International Search Report—dated Jul. 30, 2012.
German Examination Report—dated Sep. 6, 2012.

* cited by examiner

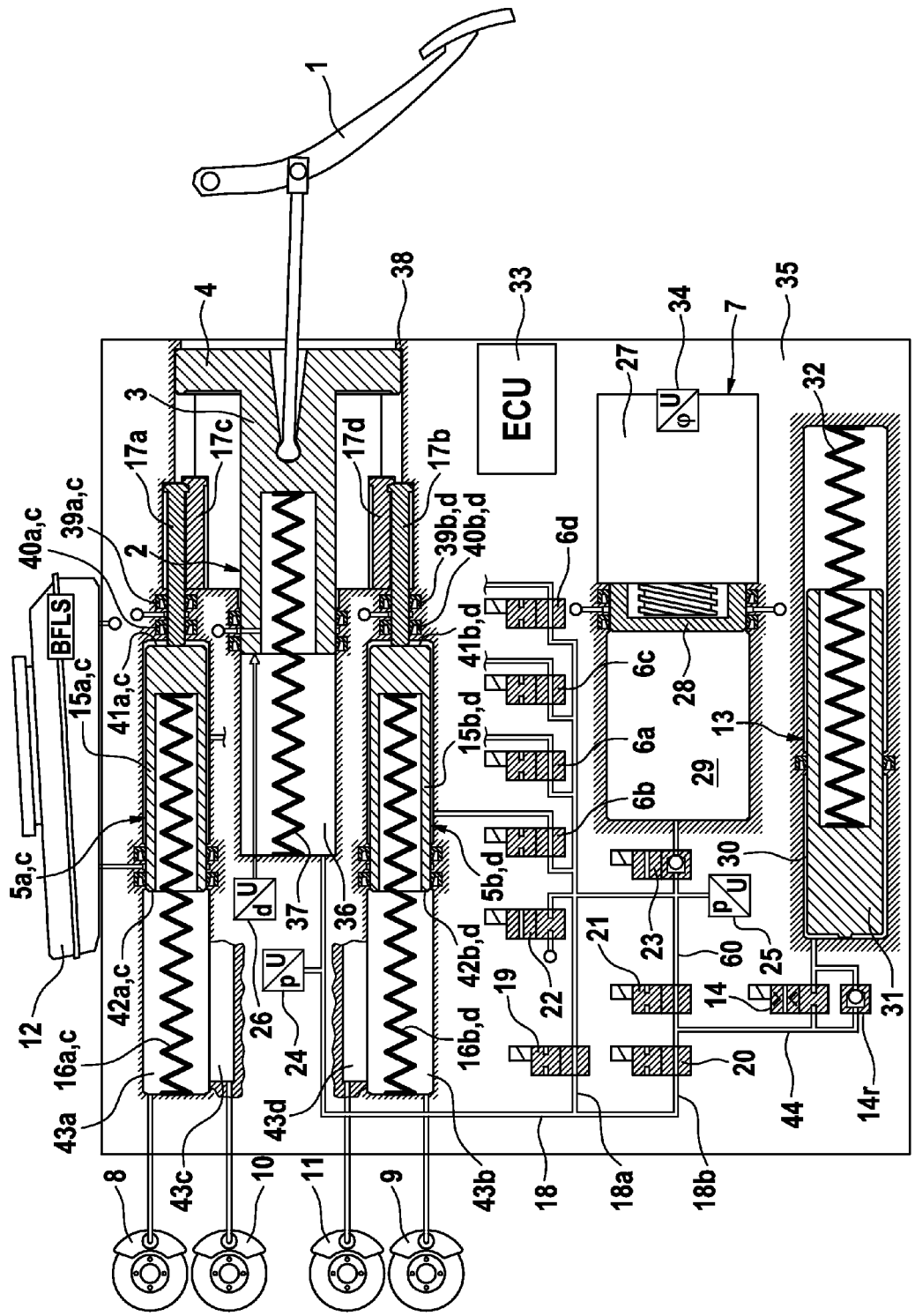

BRAKE SYSTEM FOR MOTOR VEHICLES

CROSS-REFERENCE TO RELATED APPLICATION

This application claims priority to German Patent Application Nos. 10 2010 062 010.6, filed Nov. 26, 2010; 10 2011 086 258.7, filed Nov. 14, 2011; and PCT/EP2011/070338, filed Nov. 17, 2011.

FIELD OF THE INVENTION

The present invention relates to a brake system for motor vehicles which, in a brake-by-wire operating mode, can be activated both by the vehicle driver and also independently of the vehicle driver, is preferably operated in the brake-by-wire operating mode and can be operated in at least one fall-back operating mode in which only operation by the vehicle driver is possible, comprising:

a brake pedal for actuating a hydraulic piston-cylinder arrangement having a hydraulic piston on which an actuating force (pedal force) is exerted when the brake system is actuated by the vehicle driver and which is guided displaceably in a housing along an actuation axis, a hydraulically actuable pedal travel simulator which is releasable and blockable by means of a simulator release valve, a travel detection device which detects the actuation travel of the piston, a pressure medium reservoir, an electrically controllable pressure source which delivers a brake system pressure, a pressure modulation unit having electrically controllable pressure regulating valves for adjusting wheel-individual brake pressures which are derived from the brake system pressure, the brake system pressure being supplied via a brake system pressure line to the inlet connections of the pressure regulating valves which deliver or transmit the brake system pressure in the unactivated state, dividing piston devices which are associated with the motor vehicle wheel brakes and are subjected on a first dividing piston surface to the pressure set or transmitted by the pressure regulating valves and which transmit the pressure exerted by a second dividing piston surface to the motor vehicle wheel brakes, activating elements for exerting the actuating force or for mechanically activating the dividing piston devices, which activating elements can be brought into force-transmitting connection with the piston, and an electronic control and regulation unit.

BACKGROUND OF THE INVENTION

A brake system of the general type mentioned above is known from DE 10 2009 024 034 A1. In the known brake system, the piston coupled to the brake pedal is guided in a further hydraulic piston of larger diameter which is referred to as the retaining piston. Rod-shaped force transmitting elements associated with the dividing piston devices bear against the retaining piston, which delimits a hydraulic retaining chamber which radially encompasses the retaining piston in a housing. The complex structure of the actuating arrangement described, and the considerable axial space requirement associated therewith, are regarded as disadvantageous.

It is therefore the object of the present invention to propose a simplification of the actuating arrangement which makes possible a shortening of the axial space requirement thereof.

This object is achieved according to the invention by a brake system as described herein.

Preferred embodiments of the invention are apparent from the following description with reference to a FIGURE.

BRIEF DESCRIPTION OF THE DRAWING FIGURE

In the following description the present invention is explained with reference to an exemplary embodiment and to the appended schematic drawing. In the drawing the single FIG. 1 shows the structure of an embodiment of the brake system according to the invention.

DETAILED DESCRIPTION OF THE INVENTION

The brake system represented only schematically in FIG. 1 comprises essentially a hydraulic piston 3 which is actuable by means of a brake pedal 1 and forms a component of a piston-cylinder arrangement which is denoted by reference numeral 2. The piston 3, the actuation travel of which is monitored by means of a travel sensor 26, delimits a hydraulic pressure chamber 36 accommodating a return spring 37 which preloads the piston 3 against a stop 38. The pressure built up in the pressure chamber 36 by displacement of the piston 3 is detected by means of a pressure sensor 24. The piston-cylinder arrangement 2 is formed in a housing 35 which accommodates further components of the brake system according to the invention which will be explained in the following part of the description. The brake system according to the invention further comprises dividing piston devices 5a-5d connected downstream of the piston 3 via a mechanical and hydraulic active chain, upstream of which dividing piston devices 5a-5d electrically controllable pressure regulating valves 6a-6d are connected in the hydraulic active chain and are connected to the vehicle brakes 8-11, a pressure medium reservoir 12, a pedal travel simulator 13, an electrically controllable hydraulic pressure source 7 and an electronic control and regulation unit 33. One dividing piston device 5a-5d is preferably associated with each wheel brake 8-11. Force is transmitted between a radial collar 4 formed on the piston 3 and the dividing piston devices 5a-5d by means of mechanical activation elements 17a-d which are in the form of force transmitting rods and are spaced at an axial distance from the collar 4 in the unactuated state of the brake system. This distance preferably constitutes a free clearance which corresponds to the possible actuation travel of the brake pedal 1 in the brake-by-wire operating mode. Sealing rings denoted by reference numerals 39a-39d, 40a-40d are provided to seal the activation elements 17a-d in the housing 35. Damping elements (not shown) may be arranged between the activation elements 17a-17d and the piston 3.

For greater clarity, only the first two dividing piston devices 5a, 5b are represented and described in detail, while the reference numerals 5c, 5d denote the other two dividing piston devices not shown in the drawing. The dividing piston devices 5a, 5b represented include in each case a dividing piston 15a, 15b which has a respective first dividing piston surface 41a, 41b and a second dividing piston surface 42a, 42b and which is preloaded against its actuation direction by a respective compression spring 16a, 16b. With regard to pressure, the allocation of the dividing piston surfaces 41a, 41b and 42a, 42b is preferably such that the first dividing piston surface 41a, 41b can be subjected to the pressure (wheel-individual pressure) set by the pressure regulating valves 6a, 6b, while the dividing piston surface 42a, 42b serves to build up a hydraulic pressure in the wheel brakes 8, 9. Pressure chambers 43a, 43b delimited by the dividing pistons 15a, 15b are connected by means of blockable hydraulic connections to the pressure medium reservoir 12, making possible an exchange of pressure medium between the otherwise separate hydraulic circuits and the pressure medium reservoir 12 in the unactuated state of the brake system.

The aforementioned pedal travel simulator 13, which communicates the usual brake pedal feel to the driver in brake-by-wire mode, consists in the preferred configuration shown—which, however, is not necessarily mandatory for the invention—of a hydraulic simulator chamber 30, a simulator piston 31 and a simulator spring 32 which is compressed by hydraulic displacement of the simulator piston 31. Actuation of the pedal travel simulator 13 is effected by actuation of the aforementioned piston-cylinder arrangement 2, the pressure chamber 36 of which is connected by means of hydraulic connections 18, 44 to the simulator chamber 30. A simulator release valve 14, which is closed when unenergized and is connected in parallel to a non-return valve 14r which closes towards the simulator chamber 30, is inserted in the connection 44. The simulator release valve 14 is provided with a restrictor so that, upon rapid actuation of the pedal, a pressure which is detectable with the pressure sensor 24 is present, even with a short pedal stroke, as a result of the throttling of the simulator volume flow, causing rapid activation of the wheel brakes 8-11 by the electronic unit 33. As a result of the non-return valve 14r connected in parallel, it is achieved that the return flow of pressure medium from the simulator 13 to the piston cylinder arrangement 2 is not throttled when the pedal 1 is released, so that unpleasant lifting of the driver's foot from the pedal is avoided.

In brake-by-wire mode the piston-cylinder arrangement 2 communicates hydraulically with the pedal travel simulator 13 via a hydraulic path consisting of the connections 18 and 44 and defined by energization of the solenoid valves 14, 19 and 21. In the fall-back operating mode, by contrast, all the valves are unenergized, so that the hydraulic connection 44 to the pedal travel simulator 13 is blocked. In this operating mode the hydraulic connection 18 is a constituent of the hydraulic active chain from the pedal to the wheel brakes. In the event of possible leakage in this region, the brake pedal moves under no load over a distance corresponding to the aforementioned axial free clearance between collar 4 and activation elements 17a-17d. When this clearance distance is covered the wheel brakes can be actuated by means of the activation elements. Another possible fault in the active chain in the region of the hydraulic connection 18 is undesired closure of this connection. This fault is more critical than the first-mentioned possibility of leakage because the piston-cylinder arrangement 2, and therefore the brake pedal 1, would be blocked thereby. For this reason, to provide a secure connection of the piston-cylinder arrangement 2 to a brake system pressure line 60, the hydraulic connections 18 has, according to the invention, a section of dual-circuit configuration in which one of the two circuits 18a can be blocked separately with a first shut-off valve 19 and the other circuit 18b with a second shut-off valve 21.

The pressure regulating valves 6a-6d which, when operating at the fall-back level, continue to transmit the brake system pressure unchanged to the motor vehicle wheel brakes 8-11, are connected to the brake system pressure line 60.

It is further apparent in the drawing that the aforementioned electrically controllable pressure source 7 is in the form of an electrohydraulic actuator, the piston 28 of which is actuable by means of a schematically indicated electric motor 27 via a rotation-translation gear. The distance traveled by the piston 28 is monitored by a sensor denoted by reference numeral 34, the signal of which represents the discharge volume of the pressure source 7. The piston 28 delimits a pressure chamber 29, the hydraulic outlet of which is connected to the brake system pressure line 60 in which an electromagnetically actuable valve 23, blockable in the flow direction to the pressure source 7, is inserted. As already mentioned, on the one hand the inlet connections of the pressure modulating valves 6a-6d are connected to the brake system pressure line 60 and, on the other, the aforementioned circuits are connected to the hydraulic connection 18. In addition, the brake system pressure line 60 is connectable via an electromagnetically actuable 2/2-way valve 22, which is closed when unenergized (normally closed), to the pressure medium reservoir 12. In this way pressure medium which was possibly drawn from the pressure medium reservoir via the sleeve sealing rings in the actuator and in the dividing piston devices upon rapid retraction of the electrohydraulic actuator can be discharged back into the pressure medium reservoir. The hydraulic connection from the line section 18 to the line section 44 leading to the pedal travel simulator 13 can be blocked by means of a further 2/2-way valve 20 which is open when unenergized (normally open). This valve makes it possible to test the "fluid-tightness" of the simulator release valve 14 and the non-return valve 14r connected in parallel thereto for their leakage-free blocking function with the valve 14 unenergized, by energizing the solenoid valves 19, 20, 6a, 6b, 6c, 6d while the valve 21 remains unenergized and the electrically controllable pressure source 7 builds up a test pressure. A second pressure sensor 25 serves to detect the pressure produced by the pressure source 7 and present in the brake system pressure line 60, and the volume discharged by the pressure source 7 is detected by the sensor 34. It can therefore be determined by the aforedescribed test whether pressure medium is escaping into the simulator 13 when the test pressure is applied to the valves 14, 14r. When a volume discharge occurs which exceeds the volumetric capacity determined by a resilience of a connected hydraulic element, it is concluded that leakage is present.

The operation of the brake system according to the invention is apparent to the specialist active in the relevant technical field from the disclosed content of the present patent application and therefore does not need to be explained further.

While the above-description constitutes the preferred embodiment of the present invention, it will be appreciated that the invention is susceptible to modification, variation and change without departing from the proper scope and fair meaning of the accompanying claims.

The invention claimed is:

1. A brake system for a motor vehicle which, in a brake-by-wire operating mode, can be activated both by the vehicle driver and also independently of the vehicle driver, and is normally operated in the brake-by-wire operating mode and can be operated in at least one fall-back operating mode in which only operation by the vehicle driver is possible, comprising:

a brake pedal for actuating a hydraulic piston-cylinder arrangement having a hydraulic piston on which an actuating force is exerted when the brake system is actuated by the vehicle driver and which is guided directly and displaceably in a housing along an actuation axis, a hydraulically actuable pedal travel simulator which is releasable and blockable by means of a simulator release valve, a travel detection device which detects the actuation travel of the hydraulic piston, a pressure medium reservoir, an electrically controllable pressure source which delivers a brake system pressure, a pressure modulation unit having electrically controllable pressure regulating valves for adjusting wheel-individual brake pressures which are derived from the brake system pressure of the electrically controllable pressure source, the brake system pressure of the electrically controllable pressure source being supplied via a brake system pressure line to inlet connections of the pressure regulating valves which deliver or transmit the brake system pressure of the electrically controllable pressure source through the pressure regulating valves when the pressure regulating valves are in an unenergized state, wherein the pressure regulating valves are open in the unenergized state to allow fluid to flow from the brake system pressure line toward the corresponding wheel brake and closed in an energized state to prevent fluid from flowing from the brake system pressure line toward the corresponding wheel brake;

dividing piston devices which are associated with each of the motor vehicle wheel brakes of the vehicle and are subjected on a first dividing piston surface to the wheel-individual brake pressure set or transmitted by the pressure regulating valves and which transmit the wheel-individual brake pressure exerted by a second dividing piston surface to the motor vehicle wheel brakes, activating elements for exerting the actuating force or for mechanically activating the dividing piston devices, which activating elements can be brought into force-transmitting connection with the piston, and an electronic control and regulation unit.

2. The brake system as claimed in claim 1, further comprising in that the piston is guided in the housing by means of a radial collar formed on the piston which serves to transmit force to the activating elements associated with the dividing piston devices.

3. The brake system as claimed in claim 2, further comprising in that an axial free clearance which corresponds to the possible actuation travel of the brake pedal in the brake-by-wire operating mode is provided between the collar and the activating elements.

4. The brake system as claimed in claim 1 further comprising in that a hydraulic connection which is blockable by electromagnetically actuable shut-off valves is provided between the piston-cylinder arrangement and the brake system pressure line.

5. The brake system as claimed in claim 4, further comprising in that the hydraulic connection is blocked in the brake-by-wire operating mode and is open in the fall-back operating mode.

6. The brake system as claimed in claim 4 further comprising in that the hydraulic connection has a section of dual-circuit configuration, one of the dual circuits being blockable separately with one of the shut-off valves and the other of the dual circuits being blockable with another of the shut-off valves.

7. The brake system as claimed in claim 1, further comprising in that a first pressure sensor is provided for detecting pressure of the piston-cylinder arrangement and a second pressure sensor is provided for detecting the brake system pressure.

8. The brake system as claimed in claim 1, further comprising in that a sensor, providing a signal of which represents the discharge volume of the electrically controllable pressure source.

9. The brake system as claimed in claim 8, further comprising in that the sensor is in the form of a travel or an angle sensor which detects a travel distance or a rotational angle of an actuator of the electrically controllable pressure source.

10. The brake system as claimed in claim 1, further comprising in that the electrically controllable pressure source is hydraulically connected to the brake system pressure line via an electromagnetically actuable valve which can be shut off in the flow direction to the pressure source.

11. A brake system for a motor vehicle which, in a brake-by-wire operating mode, can be activated both by the vehicle driver and also independently of the vehicle driver, and is normally operated in the brake-by-wire operating mode and can be operated in at least one fall-back operating mode in which only operation by the vehicle driver is possible, comprising:

a brake pedal for actuating a hydraulic piston-cylinder arrangement having a hydraulic piston on which an actuating force is exerted when the brake system is actuated by the vehicle driver and which is guided directly and displaceably in a housing along an actuation axis, a hydraulically actuable pedal travel simulator which is releasable and blockable by means of a simulator release valve, a travel detection device which detects the actuation travel of the hydraulic piston, a pressure medium reservoir, an electrically controllable pressure source which delivers a brake system pressure, a pressure modulation unit having electrically controllable pressure regulating valves for adjusting wheel-individual brake pressures which are derived from the brake system pressure, the brake system pressure being supplied via a brake system pressure line to inlet connections of the pressure regulating valves which deliver or transmit the brake system pressure in an unactivated state, dividing piston devices which are associated with each of the motor vehicle wheel brakes of the vehicle and are subjected on a first dividing piston surface to the wheel-individual brake pressure set or transmitted by the pressure regulating valves and which transmit the wheel-individual brake pressure exerted by a second dividing piston surface to the motor vehicle wheel brakes, activating elements for exerting the actuating force or for mechanically activating the dividing piston devices, which activating elements can be brought into force-transmitting connection with the piston, and an electronic control and regulation unit, wherein the pedal travel simulator is connected, via a simulator release valve which blocks the flow direction to the pedal travel simulator when unenergized, to a hydraulic line section which is hydraulically connected, via a first shut-off valve which is open when unenergized, to a hydraulic connection that extends from the piston-cylinder arrangement, and via a second shut-off valve which is open when unenergized, to the brake system pressure line.

12. The brake system as claimed in claim 11, further comprising in that the shutting-off of the simulator release valve when unenergized can be tested by being subjected to a test pressure while neither the hydraulic piston-cylinder arrangement, nor the dividing piston devices together with the connected wheel brakes, are subjected to the test pressure.

13. The brake system as claimed in claim 12, wherein, in order to test fluid-tightness of the unenergized simulator release valve, the electrically controllable pressure regulating valves and the first shut-off valve and a third shut-off valve, which additionally blocks the hydraulic connection that extends from the piston-cylinder arrangement to the pressure regulating valves, are closed, the electrically controllable pressure source builds up the test pressure monitored by a pressure sensor, and the discharge volume of the pressure source is monitored by means of a flow sensor.

14. The brake system as claimed in claim 13, further comprising in that, when a volume discharge occurs which exceeds a volumetric capacity determined by a resilience of a connected hydraulic element, it is concluded that leakage is present.

15. The brake system as claimed in claim 4, further comprising in that the brake system is configured as a system in which the piston-cylinder arrangement, the dividing piston devices, the pressure modulation unit, the shut-off valves, the pedal travel simulator, the controllable pressure source and the electronic control and regulation unit form one constructional unit.

* * * * *